(12) United States Patent
Okuyama et al.

(10) Patent No.: US 7,350,017 B2
(45) Date of Patent: Mar. 25, 2008

(54) MAGNETIC DISK UNIT, FILE MANAGEMENT SYSTEM, AND FILE MANAGEMENT METHOD

(75) Inventors: Kenichi Okuyama, Kawasaki (JP); Kazuya Tago, Machida (JP); Yasushi Negishi, Machida (JP)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 10/923,991

(22) Filed: Aug. 23, 2004

(65) Prior Publication Data
US 2005/0021900 A1 Jan. 27, 2005

(51) Int. Cl.
*G06F 12/00* (2006.01)
*G06F 13/00* (2006.01)

(52) U.S. Cl. .............. 711/4; 711/206; 711/202; 711/203; 711/112; 711/113; 711/114; 711/118

(58) Field of Classification Search ............ 711/4
See application file for complete search history.

(56) References Cited

U.S. PATENT DOCUMENTS 5,206,939 A * 4/1993 Yanai et al. ............. 711/4
5,623,701 A * 4/1997 Bakke et al. ............. 710/68
6,606,651 B1 * 8/2003 Linde ..................... 709/216
2001/0014929 A1 * 8/2001 Taroda et al. ............. 711/4

* cited by examiner

Primary Examiner—Jasmine Song
Assistant Examiner—Hamdy S Ahmed
(74) Attorney, Agent, or Firm—Shimokaji & Associates, P.C.

(57) ABSTRACT

A file management system including a hard disk unit and a file management unit. The file management unit manages data to be read and written from and into the hard disk unit such that data in a file is continuous in a predetermined logical address space and specifies a target data requested to be read and written from and into the hard disk unit by a predetermined logical address within the logical address space. The hard disk unit performs processing of reading and writing data after translating the predetermined logical addresses specifying the data requested to be read and written into LBAs. Then the hard disk unit performs defragmentation of data recorded on a magnetic disk based on the predetermined logical addresses.

3 Claims, 7 Drawing Sheets

MAGNETIC DISK UNIT, FILE MANAGEMENT SYSTEM, AND FILE MANAGEMENT METHOD

BACKGROUND OF THE INVENTION

1. Field of the Invention

The present invention relates to a control to read/write data from and into a magnetic disk unit, and specifically, relates to a logical operation for input-output data.

2. Background Art

As a storage device for computer devices, a hard disk unit is widely used, which is randomly accessible and the read/write process is quick. Physically, the hard disk unit magnetically records and reads data into and from a data recording area of a magnetic disk, which is partitioned into tracks and sectors. However, data is inputted/outputted under management of a file system in terms of logical units called blocks independently of the physical partitions of the data recording area. The blocks constitute a file and is used in computer processing. The file system manages files on an external storage device and is provided as a function of an operating system (OS) or the like.

FIG. 7 is a diagram showing relationship between a general hard disk unit and a file system.

Referring to FIG. 7, a hard disk unit 710 includes a magnetic disk 711 as a recording medium, a controller 712 which controls reading and writing data from and into the magnetic disk 711, and a nonvolatile memory 713 used as a cache memory. The file system 720 issues requests (input and output requests) for the hard disk unit 710 to read and write data in block units. Also, the file system 720 uses an address called a logical block address (LBA) (see "Transistor Gijutsu", p. 180-181, December 2001, CQ publishing, Co., Ltd., for example) to identify a block stored in the hard disk unit 710.

In a system like this, when a file I/O (input/output) request arrives at the file system 720 from an application or the like, the file system 720 creates and issues to the hard disk unit 710 input/output requests necessary to handle the request. Next, when the file system 720 issues a write request to the hard disk unit 710, such as a case where there is a request to write data into a file, the file system 720 determines a layout of data on the hard disk unit 710.

The hard disk unit makes a magnetic head to seek to a desired track on a rotating magnetic disk to read and write data. For this structural reason, when the hard disk unit performs operations for blocks having consecutive LBAs in both reading and writing data (sequential reading and writing), the seek operation of the magnetic head is minimized, and the performance thereof is maximized. However, it is very difficult that the hard disk unit 710 translates the layout of blocks which has been translated into LBAs in the input/output requests outputted from the file system 720 into a layout enabling a good input/output performance. This is because it is generally impossible to estimate the layout structure on the hard disk unit 710 from a write designation having been translated into LBAs.

Therefore, the file system 720 has hitherto determined a proper layout on the hard disk unit 710 to improve the performance of executing input/output requests.

In writing data, in the case where write requests for a plurality of files arrive at the hard disk unit 710 in parallel, if sequential writing is performed in the arrival order of the write requests, blocks storing data of the respective files are stored between blocks of other files. This state is called fragmentation.

On the other hand, in reading data, even when read requests for a plurality of files are simultaneously generated, since the contents of the files can be read ahead and cached in a file system level, it is desirable that the files are sequentially arranged, namely, it is desirable that there is no fragmentation.

Accordingly, the conventional file system 720 often takes a following strategy. If possible, the file system 720 does not immediately perform writing into the hard disk unit 710 in response to the write request and stores to some extent data to be written in the cache memory. The file system 720 then determines a proper layout and performs writing into the magnetic disk. By storing the data in the cache memory, input/output transactions concerning writing into the same area are reduced, and unnecessary movement of the magnetic head of the hard disk unit 710 is reduced, thus increasing writing throughput, and as well as a layout can be employed which allows less fragmentation in order not to bring disadvantages in reading.

SUMMARY OF THE INVENTION

As described above, in reading/writing data in a hard disk unit, compatible implementation of sequential reading and writing contributes to an increase in performance. Accordingly, a block layout has hitherto been controlled by using the cache memory.

However, when a commit write request is generated in the file system, the file system must immediately write into an external storage device. In this case, since data to be written cannot be stored in the cache memory, the file system is obliged to change an original seek schedule of the magnetic head, and the layout on the magnetic disk inevitably becomes one where fragmentation tends to occur.

Even if the commit write request is not generated, it remains that the contents of the cache memory must be written into the magnetic disk before the cache memory fully stores data to a storage capacity thereof. As described above, in order to obtain the layout on the magnetic disk advantageous in reading data, the data are written into discrete areas, and it is difficult to perform fast writing which is possible at sequential writing.

As a result, even if optimization is performed using the cache memory, it remains that a possible write speed of the hard disk unit limits the writing performance of the file system.

The layout on the magnetic disk advantageous in writing and the layout on the magnetic disk advantageous in reading are generally different from each other as described above. Therefore, if data is written into the magnetic disk in the layout advantageous in writing and rearranged to a layout advantageous in reading before reading the data, the performance of the file system can be significantly improved.

However, the conventional file system and hard disk unit use LBAs to specify a target where data is written, and information concerning the continuity of blocks as a file is owned by the file system and not known by the hard disk unit. As a result, the hard disk unit cannot identify whether data is written into a predetermined LBA has an optimum arrangement, or the arrangement of the predetermined LBA is inappropriate but the data is written into the predetermined LBA because commit write must be executed. Therefore, the hard disk unit cannot perform defragmentation (rearrangement of data on a magnetic disk to eliminate fragmentation) as a function thereof.

In the light of such situations, defragmentation of data (block) stored in the hard disk has hitherto been performed by control of the file system, but this has put an extra load to a computer having the file system. Especially, even in the case where the file system operates a plurality of external storage devices, there is a disadvantage that the rearrangement processing in one of the storage devices burdens the entire file system.

In order for the hard disk unit to freely change the layout of data on the magnetic disk, a construction can be conceived in which the hard disk unit incorporates the file system.

With this construction, the hard disk unit includes all information necessary for optimization of the data arrangement. Accordingly, the reduction in the read/write performance due to the layout of data on the magnetic disk can be avoided, or at least can be dissolved by the hard disk unit alone.

However, there is a problem in incorporating the file system operating code on the hard disk unit.

For example, the file size which can be handled by the storage capacity of the hard disk unit may be limited. As an example, it is assumed that four hard disk units each having a storage capacity of 60 gigabytes are connected to be used. In this case, if the file system is located on the OS side and the file system (and file system format thereof) supports a Logical Volume Manager function, a file size of 240 (=60×4) gigabytes can be created. However, if the hard disk unit incorporates the entire file system, the storage capacity of the hard disk unit becomes an upper limit of the file size, or the OS is required to have a function to make a plurality of files appear as a single file. Neither of these are practical from the viewpoint of the input-output throughput.

The function required for the file system varies depending on the OS. When the file system is incorporated in the hard disk unit, the file system of the hard disk unit is inevitably limited to a predetermined OS. Therefore, the hard disk unit depends on the OS and cannot be used for general purposes.

An object of the present invention which achieves the aforementioned objects is to provide a file management system which enables data on a magnetic disk to be rearranged by control of a hard disk unit itself, and the management method thereof.

Another object of the present invention is to improve the read/write performance of data from and into the magnetic disk.

In order to achieve the above described objects, the present invention is implemented as a magnetic disk unit constructed as follows. Specifically, this magnetic disk unit includes:

a magnetic disk as a recording medium;

a controller which controls reading/writing data from and into the magnetic disk; and an address translator section. The address translator section translates between first logical addresses used to specify predetermined data when reading/writing the data from and into the magnetic disk and second logical addresses used to exchange the data with an external device.

More specifically, the controller rearranges data (defragmentation) recorded on the magnetic disk based on the second logical addresses. Additionally, the second logical addresses used here are set in address space for each file such that data within a single file is continuous.

Moreover, when predetermined data is no longer used, the controller releases the second logical addresses associated with the disused data.

In addition, the aforementioned magnetic disk unit according to the present invention can further include a cache memory which holds data to be written into the magnetic disk and data read from the magnetic disk. In this case, the controller classifies and manages data held in the cache memory based on whether or not the data is saved in the magnetic disk and assignment of the second logical addresses to the data, and rearranges data recorded on the magnetic disk in accordance with the classification.

Another magnetic disk unit according to the present invention including: a magnetic disk as a recording medium; a controller which controls reading and writing data from and into the magnetic disk; and a cache memory. The controller holds target data for reading/writing process from and into the magnetic disk in the cache memory after classifying the data based on whether or not the data is stored in the magnetic disk and assignment of predetermined logical addresses to the data, and stores the data held in the cache memory into the magnetic disk in accordance with the classification to optimize a layout of the data stored in the magnetic disk.

Herein, the controller selects from data held in the cache memory a data which is at least not contained in the magnetic disk and assigned with the logical addresses consecutive over a length of not less than a single stride, and stores the data in a continuous recording area of the magnetic disk. The stride is a management unit of cache data, and indicates a size allowing reading and writing into the magnetic disk to be performed with enough efficiency. In other words, even if reading and writing is performed in terms of a unit larger than the stride, the efficiency is little improved. The stride is a size uniquely determined for the entire system.

Another aspect of the present invention to achieve the aforementioned object is implemented as a file management system including an external storage device of a computer; and a file management section which manages files stored in the external storage device. In this file management system, the file management section manages data to be read and written from and into the external storage device such that data in a file is continuous in a predetermined logical address space, and specifies data requested to be read and written from and into the external storage device with logical addresses in the logical address space. The external storage device translates the logical addresses specifying the data requested to be read and written into logical block addresses (LBAs), and performs processing of reading and writing data from and into a recording medium.

More preferably, the file management section issues a command to the external storage device to remove disused data. The external storage device removes information concerning the data specified by the command from correspondence information for translation between the logical addresses and the LBAs in accordance with the command.

Furthermore, the present invention is implemented as a method of managing files in an external storage device of a computer as follows. The method of managing files includes the steps of: receiving a read/write request on data specified by a logical address, which is set such that data in a file is continuous in a predetermined logical address space; and translating the logical addresses of target data in the read/write request to a logical block address (LBA) and performing read/write process from and into a recording medium based on the LBA.

Another method of managing files according to the present invention includes the steps of: performing read/write process from and into a recording medium based on a read/write request on data received from the computer; holding target data of the read/write process into a cache memory after classifying the data based on whether or not the data is stored in the recording medium and assignment of predetermined logical addresses to the data; and optimizing a layout of the data stored in the recording medium by storing data held in the cache memory into the recording medium in accordance with the classification at a predetermined time.

BRIEF DESCRIPTION OF THE DRAWINGS

For a more complete understanding of the present invention and the advantages thereof, reference is now made to the following description taken in conjunction with the accompanying drawings.

DETAILED DESCRIPTION

Although the preferred embodiments of the present invention have been described in detail, it should be understood that various changes, substitutions and alternations can be made therein without departing from spirit and scope of the invention as defined by the appended claims.

Hereinafter, the present invention will be described in detail based on an embodiment shown in the accompanying drawings.

In the present embodiment, logical address space called frame address is newly defined, and data stored in the hard disk unit is managed using this address space.

Figure 1:
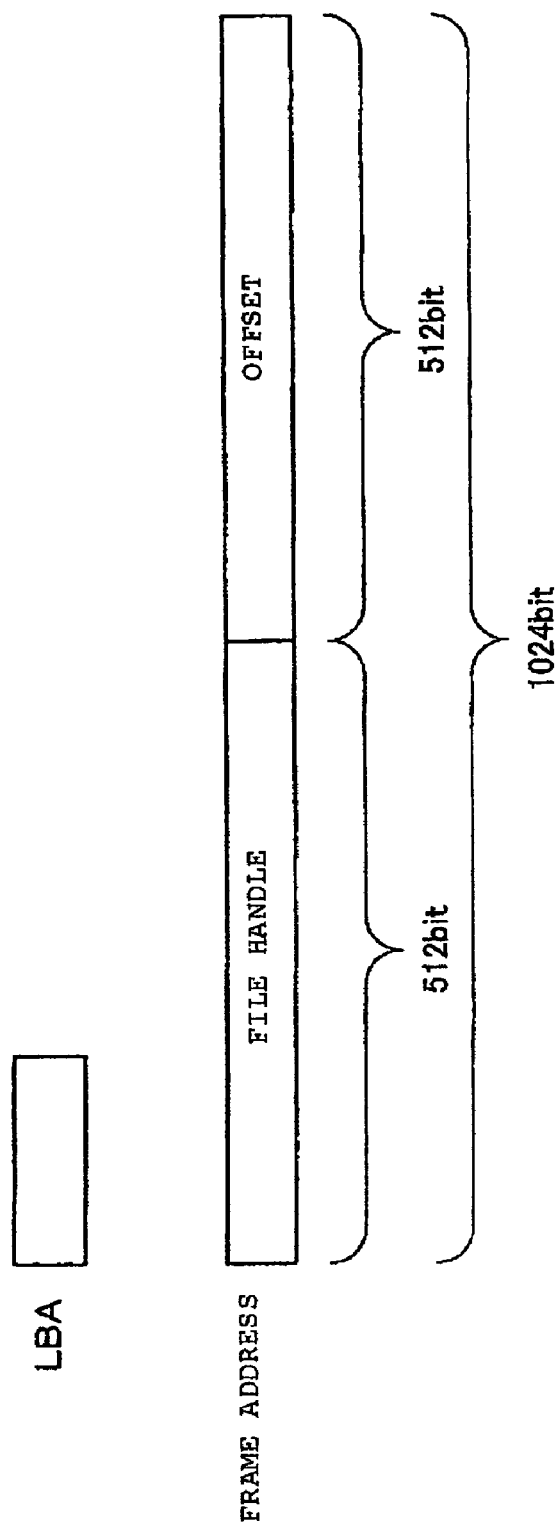
FIG. 1 is a view showing a concept of a frame address used in an embodiment.

FIG. 1 is a diagram showing a concept of the frame address.

As shown in FIG. 1, the frame address is a bit string expressing huge address space. In an example shown in the drawing, the bit length of the frame address is assumed to be 1024 bits, but actually may be any length as long as it is long enough compared to the storage capacity of the hard disk unit.

The file system arranges individual files on frame address space such that data in each file is continuous and a free space is arranged between files that is large enough that the presence of another file does not cause overwriting or corruption of adjacent files.

In writing, the hard disk unit writes data into the magnetic disk while creating a correspondence table between frame addresses and an actual layout on the magnetic disk. The layout on the magnetic disk in writing is properly determined by a controller of the hard disk unit. On the other hand, in reading, the hard disk unit reads data of specified frame addresses based on the layout correspondence table created at writing. In the case where a block holding frame addresses adjacent thereto is located at a position apart therefrom on the magnetic disk, the controller performs a defragmentation process based on the read data to optimize the layout of data on the magnetic disk if the controller determines it to be appropriate. Also, the controller may independently perform the defragmentation process at a time determined appropriate. Since there is no change in the frame addresses by the defragmentation processing, the defragmentation processing can be performed transparently from the file system.

Since the frame address space does not directly correspond to the physical blocks on the magnetic disk unlike the LBAs, it is required to explicitly recover unused frame addresses and the corresponding physical blocks on the magnetic disk. Specifically, in the case of LBAs, the LBAs directly corresponded to the physical blocks on the magnetic disk. Therefore, when a predetermined LBA was no longer used, it was possible to reuse the disused LBA and the physical block on the magnetic disk by using the relevant LBA for another purpose. On the contrary, in the case of frame addresses, the LBAs corresponding to the disused frame addresses and the physical blocks on the magnetic disk are not reused for another purpose, so that it is required to explicitly release the disused address. Accordingly, when a predetermined file on the file system is deleted, the frame addresses corresponding to the file is explicitly removed, namely, eliminated from the layout correspondence table.

Figure 2:
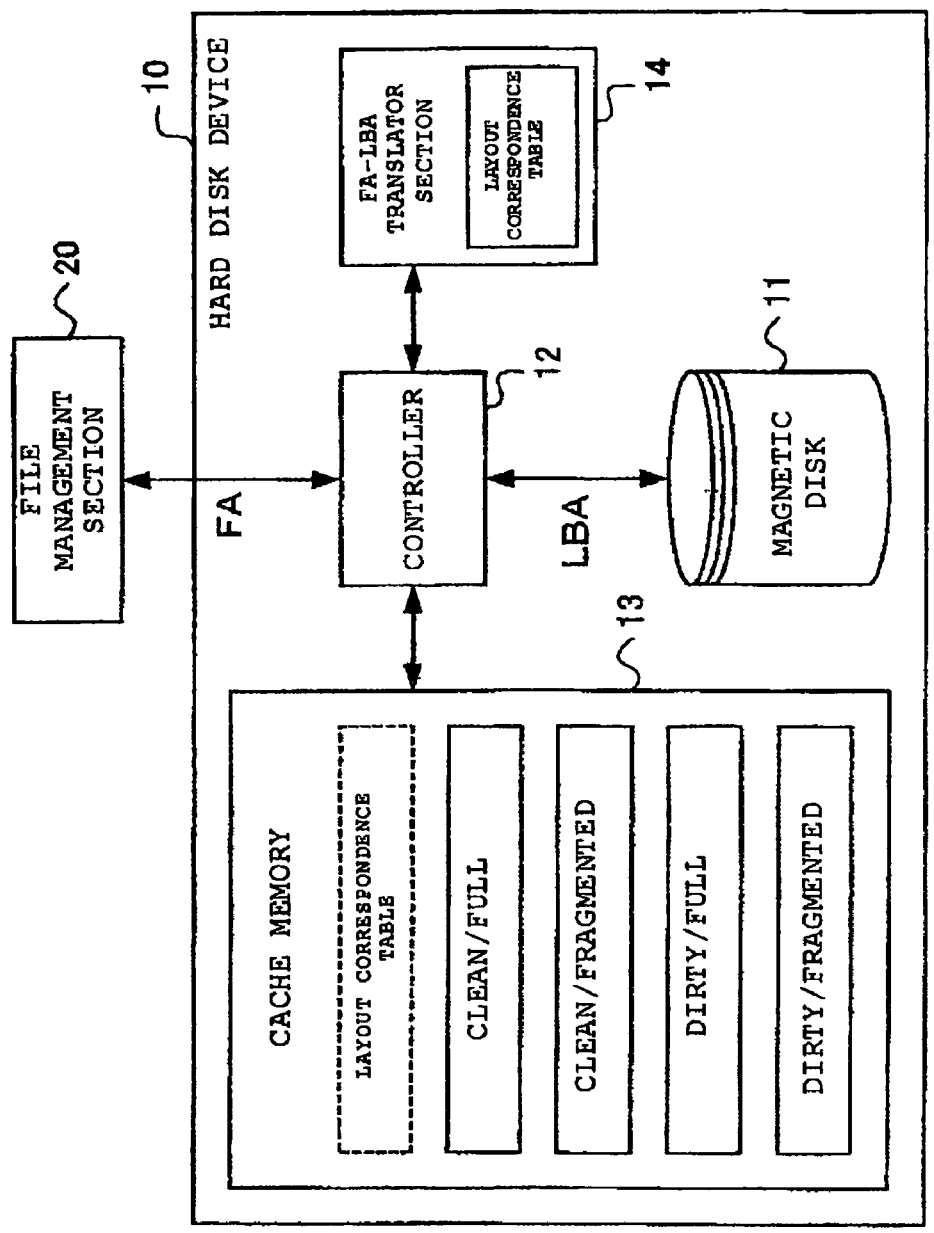
FIG. 2 is a diagram showing a construction of a file management system in the embodiment.

FIG. 2 is a diagram showing a construction of the file management system according to the present embodiment.

Referring to FIG. 2, the file management system of the present embodiment includes a hard disk unit 10 and a file management section 20 which controls the hard disk unit 10 to read and write files. The hard disk unit 10 is an external storage device connected to a computer device. The file management section 20 is a software block implemented by a program-controlled CPU of the computer device using the hard disk unit 10 as the external storage device. Specifically, the file management section 20 is implemented by a file system provided as a function of the OS. Blocks (data) exchanged between the hard disk unit 10 and the file management section 20 are specified by the frame addresses (FAs) in accordance with a read/write request from the file management section 20.

The hard disk unit 10 includes a magnetic disk 11 as a recording medium, a controller 12 which controls reading and writing data from and into the magnetic disk 11, a cache memory 13 implemented by a nonvolatile memory or the like, and an FA-LBA translator section 14 which translates between frame addresses and LBAs. The controller 12 and the FA-LBA translator section 14 are software blocks each implemented by a processor or the like controlled by a program stored in a not-shown ROM or the like.

The magnetic disk 11 magnetically records data under the control of the controller 12. The controller 12 receives requests to write and read data from the file management section 20 and controls various units (not shown) to perform mechanical operations such as seek of the magnetic head and read and write data from and into the magnetic disk 11. Blocks exchanged between the controller 12 and the magnetic disk 11 are specified by LBAs. The cache memory 13 temporarily holds data read from the magnetic disk 11, the read/write requests sent from the file management section 20, and data contained in these requests. The FA-LBA translator section 14 translates between the frame addresses used to specify blocks between the file management section 20 and the controller 12, and the LBAs used to specify blocks between the controller 12 and the magnetic disk 11. The translation of the address space uses the layout correspondence table. This layout correspondence table is created during writing data into the magnetic disk 11 and held in the cache memory 13 (indicated by a dashed line in FIG. 2).

A cache area of the cache memory 13 is classified into a total of four areas with two categories.

The first category is classified into "clean" and "dirty," which indicate whether cache data has already been saved on the magnetic disk. The "clean" indicates that an image on the magnetic disk agrees with the cache data (the data is saved). The "dirty" indicates that the image on the magnetic disk does not agree with data in the cache (the data is not saved) and therefore the cache data needs to be saved on the magnetic disk.

The second category is classified into "full" and "fragmented", which indicate assignment of the frame addresses to data. The cache manages cache data in terms of a unit called stride. In the case of reading, the stride is a size large enough so that sequential reading of data on the magnetic disk is made with efficiency. The "full" indicates that all the contents within a stride is composed of blocks constituted by consecutive frame addresses. The "fragmented" indicates that the contents of a stride is composed of blocks which are pointed out by nonconsecutive frame addresses.

Therefore, the cache area of the cache memory 13 is classified into four types of a clean/full cache area, a clean/fragmented cache area, a dirty/full cache area, and a dirty/fragmented cache area.

Next, a description will be given of an operation in the embodiment for each request issued from the file management section 20 to the hard disk unit 10.

1. Operation for a Write Request

Figure 3:
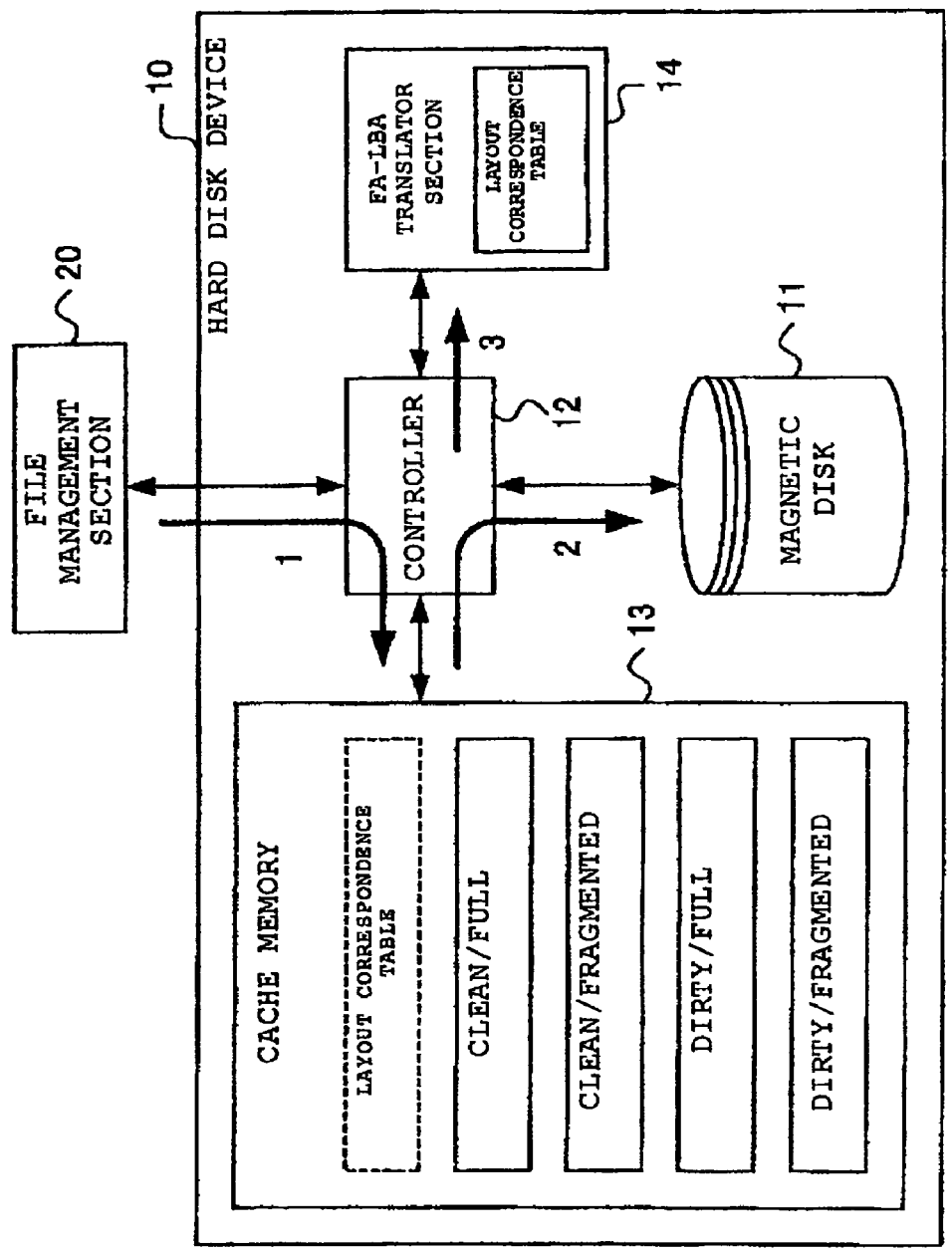
FIG. 3 is a diagram showing an operation in the case where a write request is issued from a file management section to a hard disk unit in the embodiment.

FIG. 3 is a diagram showing an operation in the case where a write request is issued from the file management section 20 to the hard disk unit 10.

First, the controller 12 receives the write request and stores data to be written into the cache memory 13 (arrow 1 in FIG. 3). At this point, the data is managed with frame addresses. When the amount of data to be written fulfills a stride, the data is registered in the dirty/full cache area. On the contrary, when the data to be written does not fulfill a stride, frame addresses of the data and other cache data are compared. When a combination of data which fulfills a stride is made, such data are collected and registered in the dirty/full cache area. In other cases, the data to be written is registered in the dirty/fragmented cache area.

Next, the controller 12 writes the cache data held in the dirty/full cache area into the magnetic disk (arrow 2 in FIG. 3). At this time, an area where the data is to be written is determined on the free space of the magnetic disk such that a cache image of a single stride has consecutive LBAs. The cache data which has been written is moved to the clean/full cache area.

Next, concerning the data written into the magnetic disk 11 (cache data moved to the clean/full cache area), the FA-LBA translator section 14 registers corresponding frame addresses and LBAs in the layout correspondence table (arrow 3 in FIG. 3). When the frame addresses of the cache data held in the dirty/fragmented cache area are registered in the layout correspondence table, these frame addresses are released.

2. Operation for a Read Request

Figure 4:
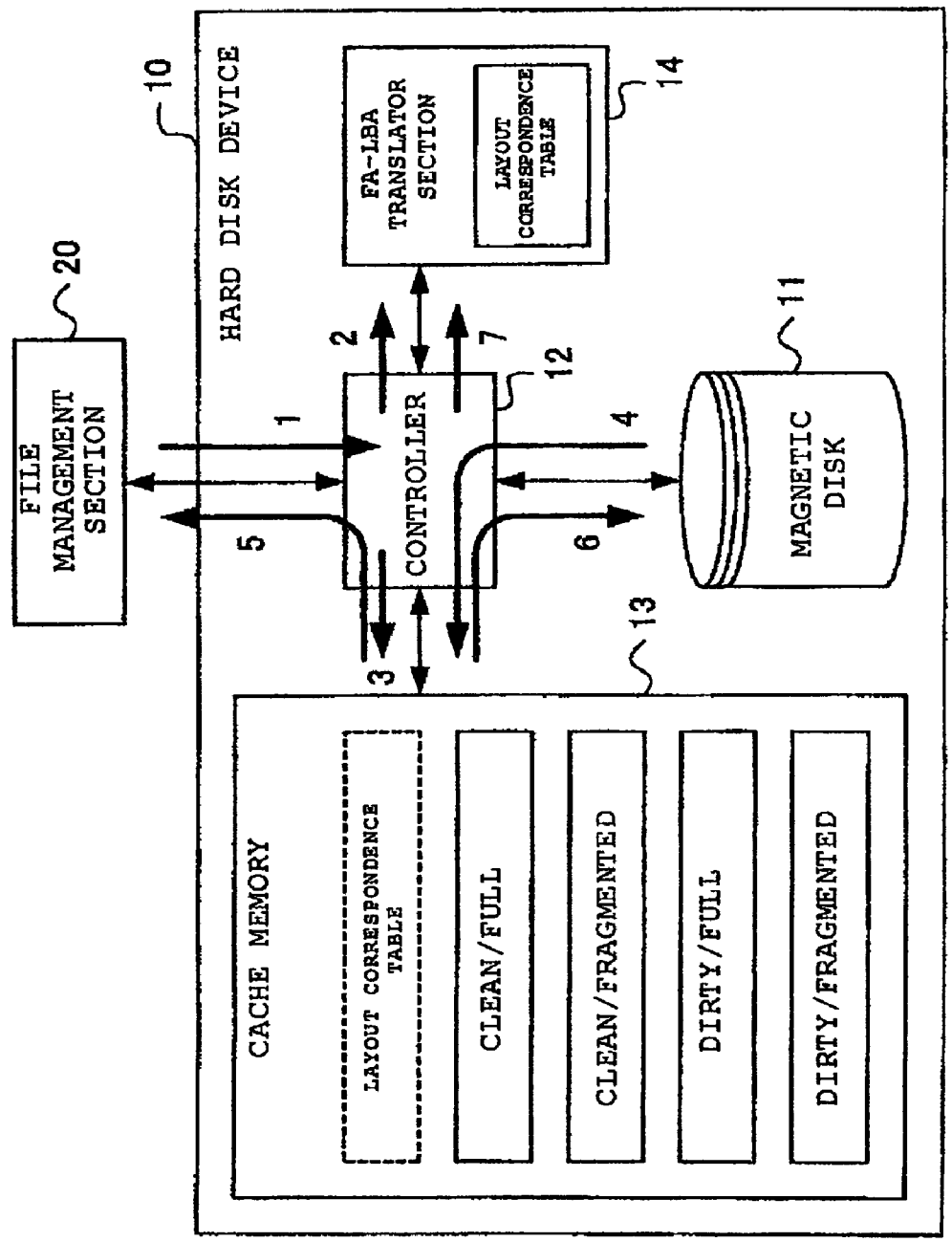
FIG. 4 is a diagram showing an operation in the case where a read request is issued from the file management section to the hard disk unit in the embodiment.

FIG. 4 is a diagram showing an action in the case where a read request is issued from the file management section 20 to the hard disk unit 10.

First, the controller 12 accepts the read request (arrow 1 in FIG. 4). The controller 12 inquires the FA-LBA translator section 14 to acquire the LBAs corresponding to the frame addresses in a range requested to be read (arrow 2 in FIG. 4), and checks whether data in the range to be read is in the cache of the cache memory 13 (arrow 3 in FIG. 4). The data in the cache memory can be part of data in the range to be read.

Next, the controller 12 reads part of data to be read which was not in the cache memory 13 from the magnetic disk 11 to the cache memory 13 (arrow 4 in FIG. 4). At this time, data outside the range to be read is read such that the size of the data to be read is the same as the full stride size. In the case where the layout of the data to be read is discontinuous on the magnetic disk 11 at a stride size level, the controller 12 stores the data read with the full stride size into the dirty/full cache area in the cache memory 13. This allows the data of the full stride size to be continuously written into the magnetic disk 11 later. In other cases, the read data is stored in the clean/full data cache area.

When the range of the frame addresses corresponding to the read data does not reach the full stride size, the controller 12 arranges the cached data blocks sequentially as possible and resisters the data as the dirty/fragmented data.

Next, the controller 12 returns the data in the range requested to be read to the file management section 20 (arrow 5 in FIG. 4). Reading data requested from the file management section 20 is thus completed.

Thereafter, the controller 12 writes the cache data held in the dirty/full cache area into the magnetic disk 11 (arrow 6 in FIG. 4). At this time, free areas are utilized such that the cache data can be written into the magnetic disk 11 in full strides and that the individual strides are arranged in frame address order. The cache images are sequentially moved to the clean/full cache area on finishing being written into the magnetic disk 11. In the end, the FA-LBA translator section 14 sequentially registers into the layout correspondence table the cache data which is write complete. (arrow 7 in FIG. 4) In the aforementioned operations, the old correspondence concerning the data read from the magnetic disk 11 is deleted from the layout correspondence table.

3. Operation for a Remove Request

As previously described, it is required to explicitly recover frame address space corresponding to a file removed on the file management section 20, that is, to make the frame address space available for a subsequent write. In the embodiment, a delete command called a remove request is defined and issued from the file management section 20. Thus, frame addresses corresponding to the disused data are released. The remove request specifies the top address (frame address) and the data length of the data which is no longer to be used.

Figure 5:
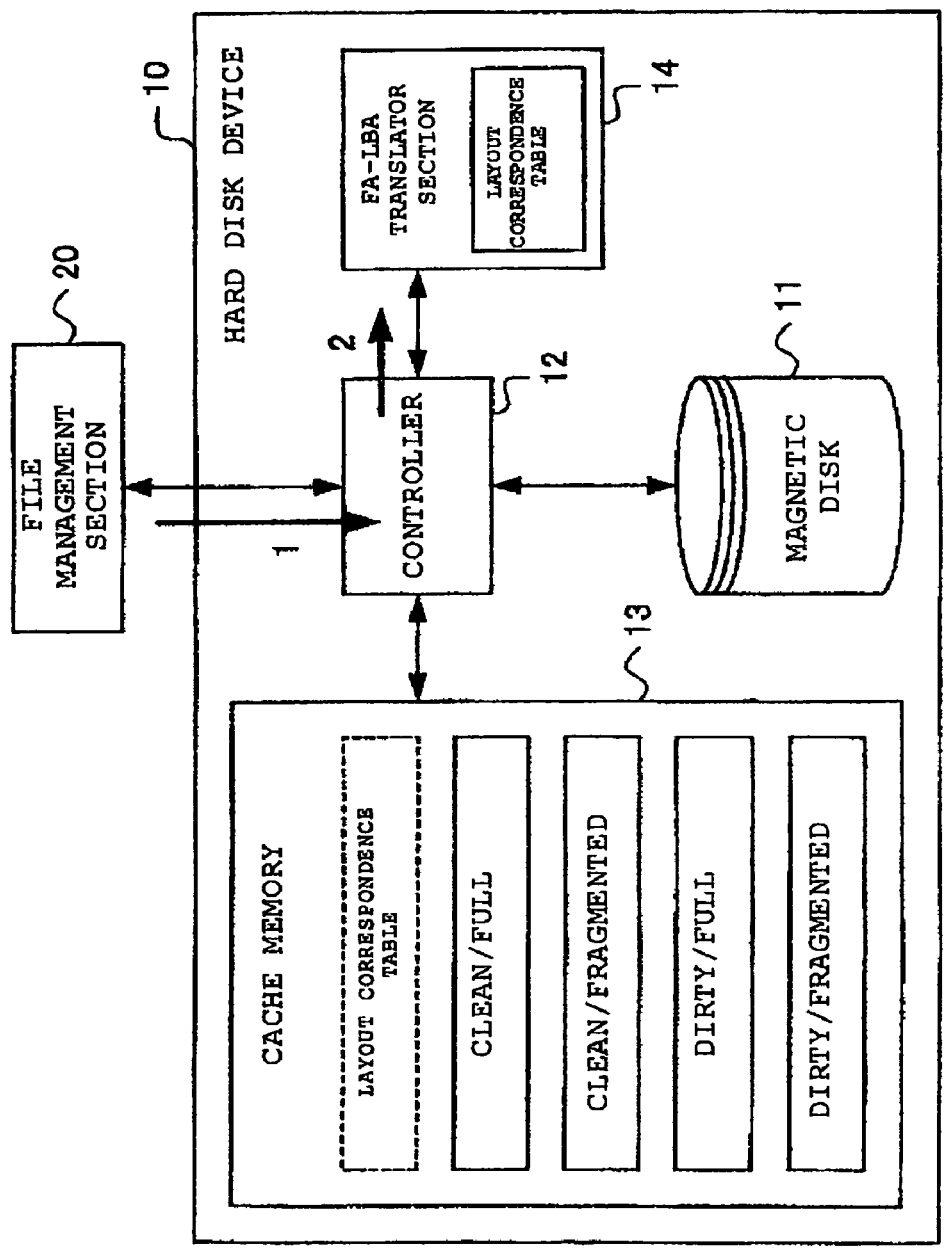
FIG. 5 is a diagram showing an operation in the case where a remove request is issued from the file management section to the hard disk unit in the embodiment.

FIG. 5 is a diagram showing an operation when a remove request is issued from the file management section 20 to the hard disk unit 10.

First, the controller 12 accepts the remove request (arrow 1 in FIG. 5), and then identifies all frame addresses to be deleted based on the top address and the range (data length) of the data specified in the remove request. Next, the FA-LBA translator section 14 deletes the frame addresses to be deleted which are specified by the controller 12 from the layout correspondence table (arrow 2 in FIG. 5).

In this manner, the unused block (space of frame addresses) is properly reused for other files.

4. Operation with No Request Accepted

The hard disk unit 10 according to the embodiment performs defragmentation of data written in the magnetic disk 11 while the hard disk unit 10 has no request received from the file management section 20, namely, while the hard disk unit 10 is under low-load. In the embodiment, the correspondence between frame addresses and LBAs are managed by the hard disk unit 10, so that defragmentation can be executed as an independent operation of the hard disk unit 10.

Figure 6:
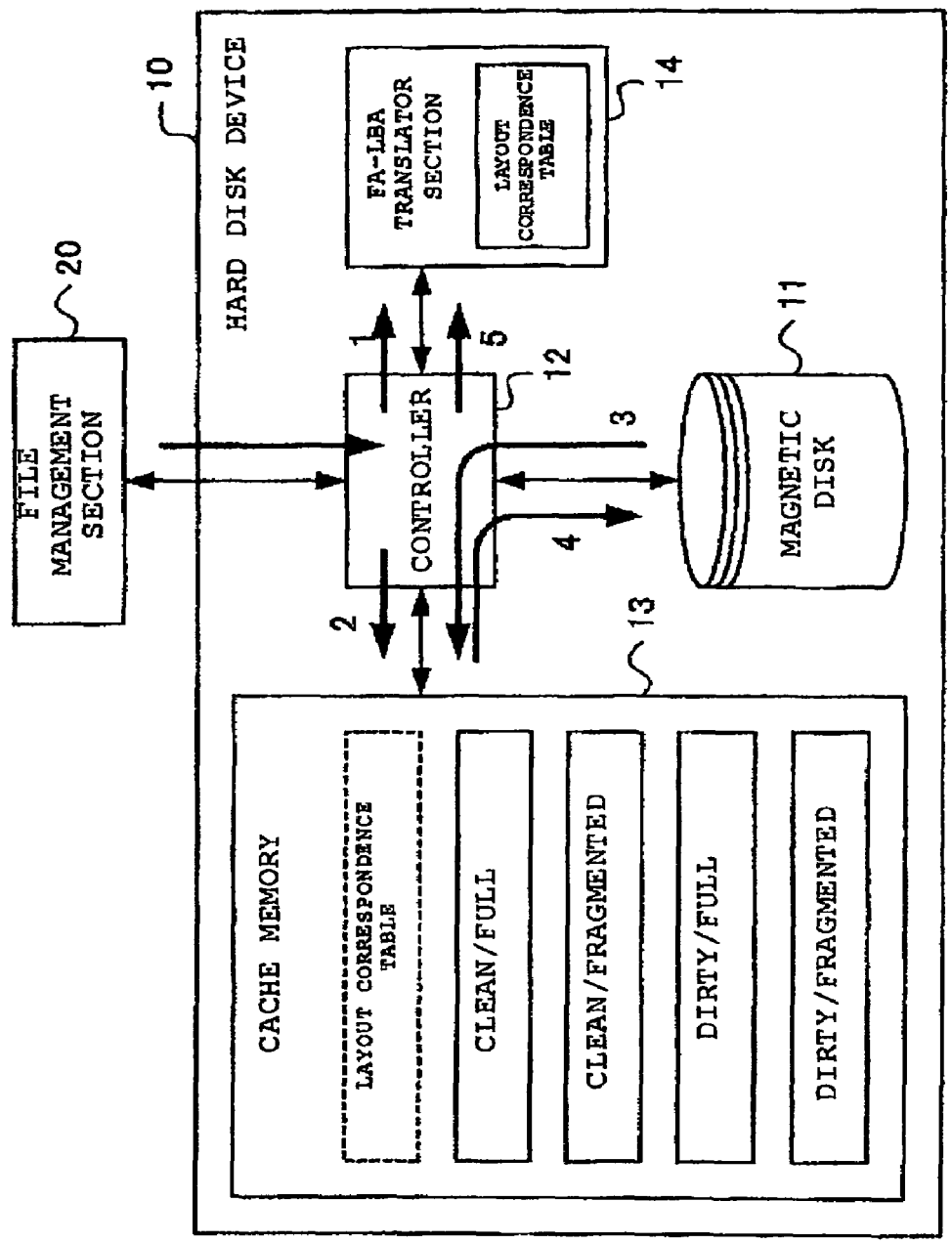
FIG. 6 is a diagram showing an operation of defragmentation that the hard disk unit independently performs in the embodiment.
Figure 7:
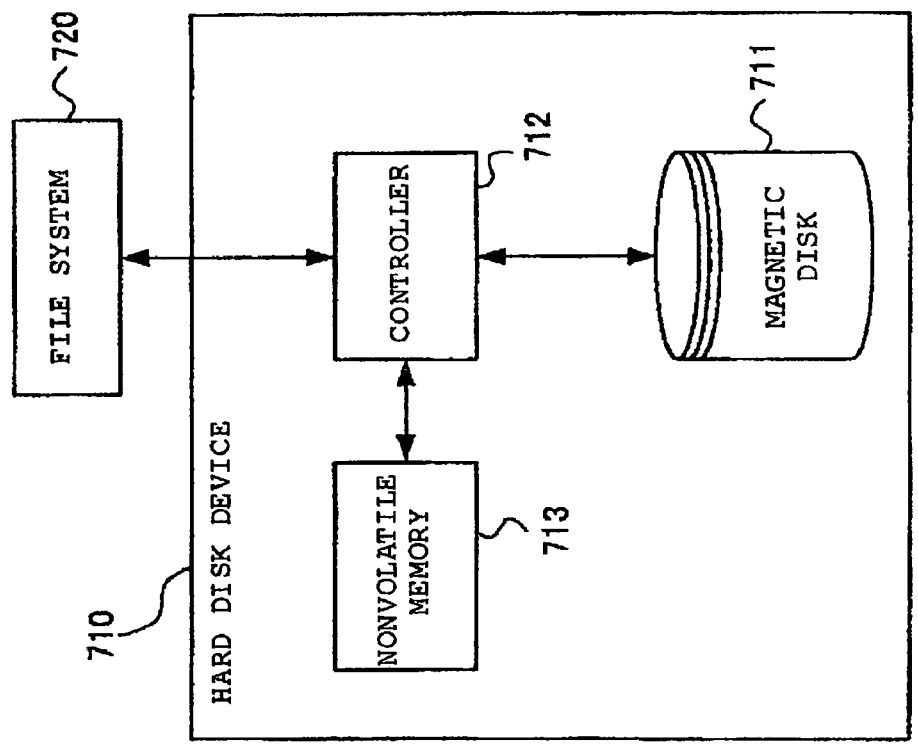
FIG. 7 is a diagram showing a relationship between a general hard disk unit and a file system.

FIG. 6 is a diagram showing a reaction of defragmentation that the hard disk unit independently performs.

The controller 12 inquires the FA-LBA translator section 14 to examine a file with a range of frame addresses not less than a single stride size and being discontinuously arranged on the magnetic disk (arrow 1 in FIG. 6). Moreover, it is examined whether data stored in the dirty and fragment cache area includes a data which can constitute a full stride with a data registered in the layout correspondence table (arrow 2 in FIG. 6).

Next, the controller 12 selects a single stride of a frame address from these examination results, and then reads a block which does not exist in the cache from the magnetic disk 11. The controller 12 further recompiles the contents of the cache into stride units and holds the recompiled data in the clean/full cache area (arrow 3 in FIG. 6). As used herein and described previously above "clean" and "dirty," indicate whether cache data has already been saved on the magnetic disk. The "clean" indicates that an image on the magnetic disk agrees with the cache data (the data is saved). The "dirty" indicates that the image on the magnetic disk does not agree with data in the cache (the data is not saved) and therefore the cache data needs to be saved on the magnetic disk.

Next, the controller 12 writes the cache data held in the dirty/full cache area into a continuous area on the magnetic disk 11 (arrow 4 in FIG. 6). The cache data which has been written into the magnetic disk 11 is moved to the clean/full cache area.

In the end, the FA-LBA translator section 14 registers data in an order from data that is write complete into the magnetic disk 11, into the layout correspondence table the correspondence between the frame addresses and the LBAs (arrow 5 in FIG. 6). Concerning the data which was read from the magnetic disk 11, the old correspondence between the frame address and the LBA is deleted.

Next, reuse of the cache will be described.

When data contained in the write request from the file management section 20 or the data read from the magnetic disk 11 is for cache use, in the case where there is no free space in the cache area of the cache memory 13, the cache data in the clean/full and the clean/fragmented cache area is first removed in accordance with a least recently used system (LRU) to secure a cache area. There is no problem if the data belonging to the clean category is deleted because the data in the clean category has already been recorded on the magnetic disk 11.

Since data in the dirty/full cache area is written into the magnetic disk 11 capable of being written into as appropriate, it is impossible that data in use remains in this cache area.

When area could not be acquired from both the clean/full and the clean/fragmented cache areas, free space is secured from the dirty/fragmented cache area. In this case, since data held in this cache area is waiting to be written into the magnetic disk 11, the data in the cache area cannot be just discarded. Therefore, cache images therein are written into the magnetic disk 11 in accordance with the LRU. In this case, the strides are continuously written into the magnetic disk 11. The layout correspondence table corresponding to the strides written into the magnetic disk 11 is updated.

The data written into the magnetic disk 11 is moved to the clean/fragmented cache area and then removed from the cache area to secure free space.

Incidentally, when the utilization rate of the magnetic disk 11 of the hard disk unit 10 is near 100%, effort required for the defragmentation process generally increases. Therefore, to prevent the utilization rate of the magnetic disk 11 from increasing to near 100%, instead of allowing users to use the entire storage capacity of the magnetic disk 11, preferably, a capacity to be used by the controller 12 is previously secured, and a capacity remaining after subtracting this margin may be presented to the file management section 20.

As described above, according to the present invention, it is possible to provide a file management system which can rearrange data (defragmentation) on the magnetic disk by control of the hard disk unit itself and to provide a management method thereof.

Moreover, according to the present invention, the hard disk unit independently rearranges data on the magnetic disk appropriately. Hence, data can be read and written in layouts on the magnetic disk which are advantageous in reading and writing data, respectively. Therefore, the read/write performance of data can be improved.

What is claimed is:

1. A magnetic disk unit, comprising:
    a magnetic disk as a recording medium;
    a controller which controls reading and writing data, having a first logical address, from and into the magnetic disk said controller rearranging data on the magnetic disk based on a second logical address to eliminate fragmentation thereof;
    an address translator section which translates between said first logical address used to specify predetermined data when reading and writing the data from and into the magnetic disk and the second logical address used to exchange the data with an external device, the second logical address being set in address space such that the data within a single file is continuous and wherein when a predetermined data is no longer used, the controller releases the second logical address associated with the data that is no longer used; and
    a cache memory of the data which holds data to be written to the magnetic disk or data read from the magnetic disk, wherein the controller classifies and manages data held in the cache memory as one of clean/full, clean/fragmented, dirty/full, and dirty/fragmented based on whether or not the data is saved in the magnetic disk, clean indicating that data has been saved and dirty indicating that data has not been saved, full indicating that all of the contents within a stride is composed of blocks of consecutive frame addresses and fragmented indicating that the contents of a stride is composed of blocks of nonconsecutive frame addresses and assignment of the second logical address to the data, and defragments the data recorded on the magnetic disk in accordance with the classification.

2. A method of managing files in an external storage device of a computer, comprising the steps of:
    performing a read/write process from and into a recording medium based on a read/write request on data received from the computer;
    classifying the data based on whether or not the data is stored in the recording medium and assignment of a predetermined second logical address in the recording medium to the data, and holding in a cache memory target data of the read/write process; said cache memory holding data to be written to the recording medium or data read from the recording medium, classifying and managing data held in the cache memory as one of clean/full, clean/fragmented, dirty/full, and dirty/fragmented based on whether or not the data is saved in the recording medium clean indicating that data has been saved and dirty indicating that data has not been saved, full indicating that all of the contents within a stride is composed of blocks of consecutive frame addresses and fragmented indicating that the contents of a stride is composed of blocks of nonconsecutive frame addresses;

optimizing a layout of the data stored in the recording medium by storing data held in the cache memory into the recording medium in accordance with the classification, based on said second logical address, at a predetermined time to eliminate fragmentation; and defragmenting the data recorded on the recording medium in accordance with the classification of the data as to whether or not the data is stored in the recording medium and whether or not the data has a second logical address.

3. The method of claim 2 wherein the recording medium is a magnetic disk.

* * * * *